A. PETERSON.
COLLAPSIBLE WAGON.
APPLICATION FILED JUNE 26, 1911.
1,054,364.
Patented Feb. 25, 1913.
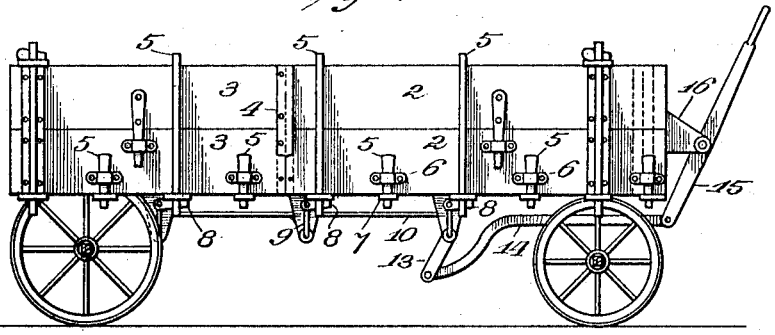
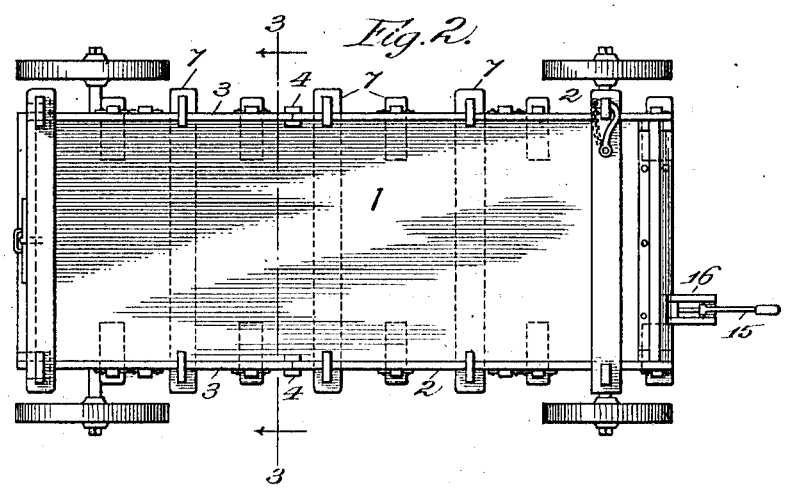
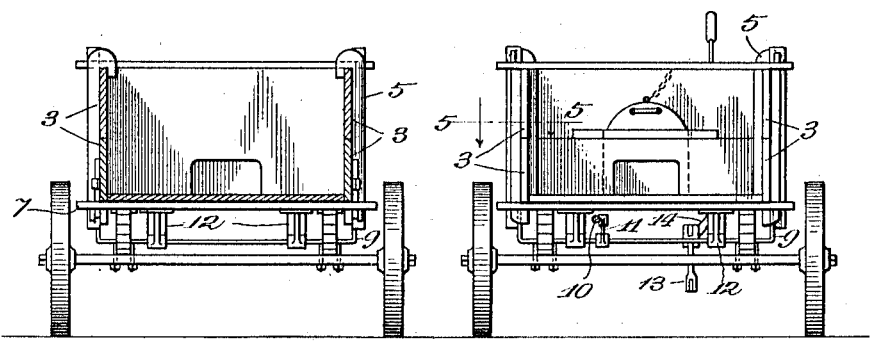
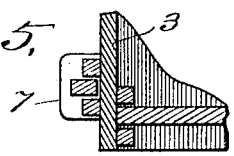

UNITED STATES PATENT OFFICE.

ALFRED PETERSON, OF TOMPKINS, SASKATCHEWAN, CANADA.

COLLAPSIBLE WAGON.

1,054,364.  Specification of Letters Patent.  Patented Feb. 25, 1913.

Application filed June 26, 1911. Serial No. 635,344.

*To all whom it may concern:*

Be it known that I, ALFRED PETERSON, a citizen of the Dominion of Canada, residing at Tompkins, in the Province of Saskatchewan, in the Dominion of Canada, have invented certain new and useful Improvements in Collapsible Wagons, of which the following is a specification.

This invention relates to improvements in that class of vehicles known as collapsible wagons or "dump wagons" and its object is to produce a device of this class in which the stays that hold the vehicle body in stable assembled position may be instantaneously loosened so that they may be readily withdrawn.

Other objects are cheapness of manufacture and durability.

With the foregoing and other objects in view the invention consists in the combination and arrangement of parts to be hereinafter fully described in the following specification, pointed out in the claim and illustrated in the accompanying drawings which form a part of said specification and in which—

Figure 1 is a side elevation of the vehicle complete. Fig. 2 is a plan. Fig. 3 is a vertical section taken on line 3—3 of Fig. 2. Fig. 4 is an end elevation. Fig. 5 is a section taken on line 5—5 of Fig. 4.

Like reference characters indicate corresponding parts throughout the several views.

1 is the wagon bed upon which a plurality of side members 2 and 3, each extending approximately half the length of the wagon bed, are arranged with their adjacent vertical ends held in alinement by a pair of cleats 4 secured to one of the side members and overlapping the end of the other side member. The side members are held to the wagon bed by a plurality of stakes 5 disposed in brackets 6 secured to the said side members; the said stakes have their lower extremities protruding through bracket-eyes formed in transverse brackets 7 that are secured to the under side of the wagon bed. The lower termination of the stake 5 may be apertured for the reception of a pin 8 secured to a crank shaft 9 that runs transversely of the wagon bed and is connected to a longitudinal rod 10 by means of suitable rockers 11 and is supported by depending members 12 secured to the wagon bed. The forward crank shaft 9 is secured by a link 13 to an elongated link 14 that is connected at its opposite end to a lever 15 fulcrumed at the front end of the wagon in a support 16.

It is readily seen that by drawing the handle of the lever 15 toward the vehicle body the longitudinal rod 10 will be driven toward the rear end of the wagon which operation will withdraw the pins 8 from the stakes 5 so that they can be readily raised out of engagement with the bracket-eyes and the wagon collapsed.

What I claim is:—

In a collapsible wagon provided with suitable apertured stays, a longitudinal rod disposed beneath the wagon bed, a plurality of transverse crank shafts likewise disposed beneath the said bed, rockers connecting the said rod and crank shafts, pins terminally carried by the said crank shafts for engagement with the aforesaid stays and a lever fulcrumed at one end of the wagon and connected to the aforesaid longitudinal rod.

In testimony that I claim the foregoing as my own I have hereto affixed my signature in the presence of two subscribing witnesses.

ALFRED PETERSON.

Witnesses:
 EUGENE WEBER,
 AUGUST WALLMARK.

Copies of this patent may be obtained for five cents each, by addressing the "Commissioner of Patents, Washington, D. C."